Nov. 15, 1932.    G. R. BRYANT    1,887,798
ROTARY FILTER PRESS
Filed Aug. 2, 1930    4 Sheets-Sheet 1
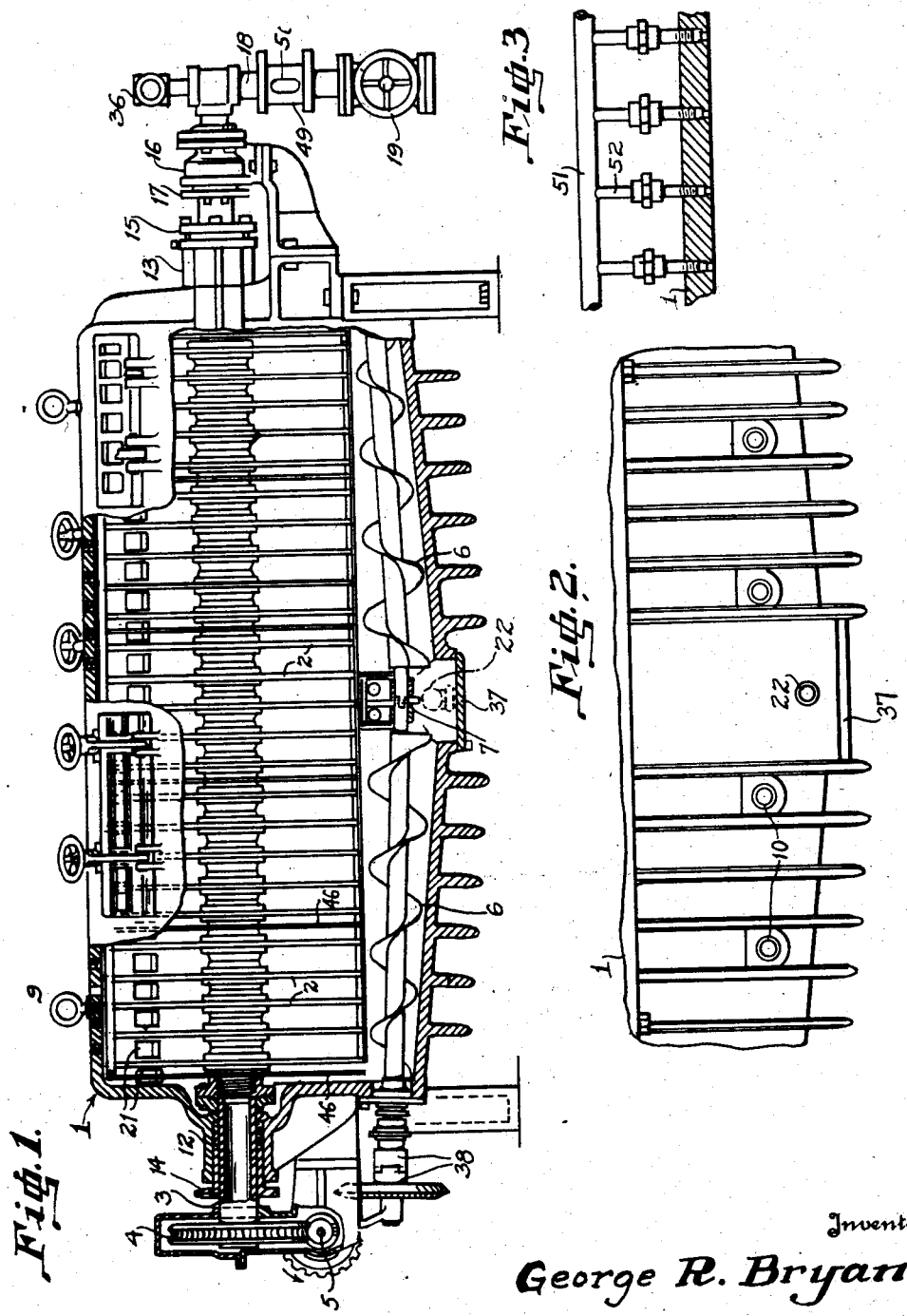
Inventor
George R. Bryant
By Mason Fenwick Lawrence
Attorneys

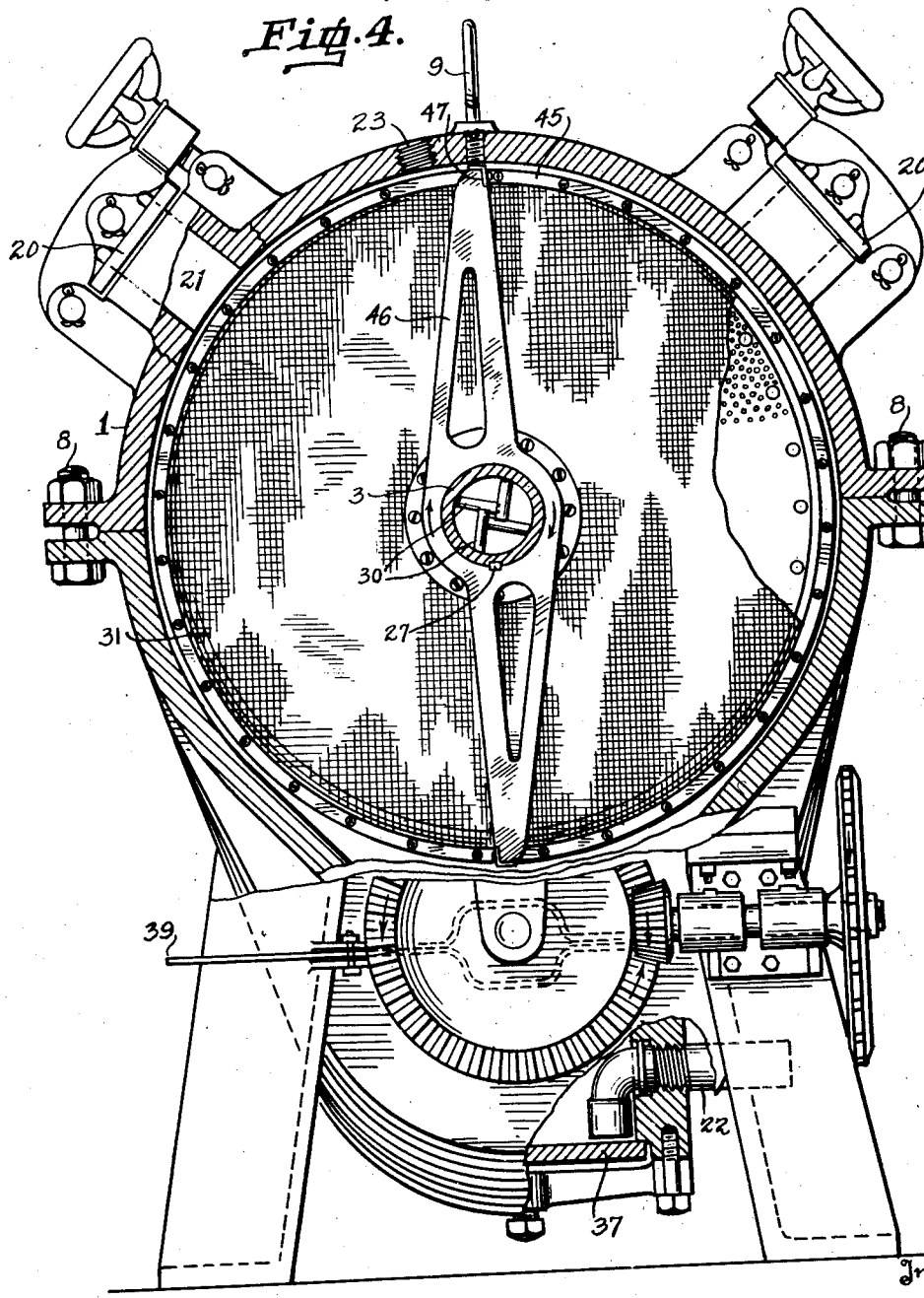

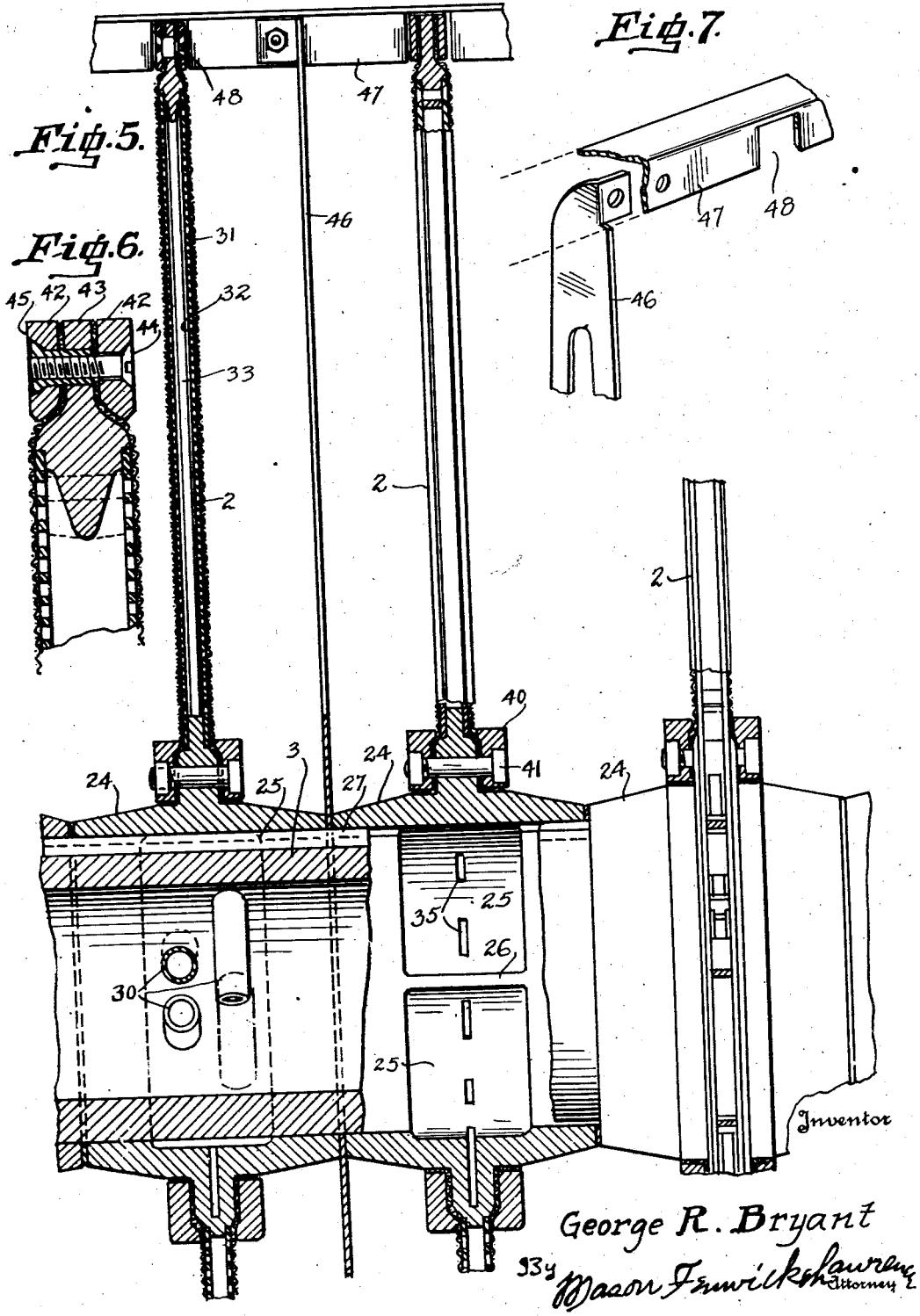

Nov. 15, 1932.  G. R. BRYANT  1,887,798
ROTARY FILTER PRESS
Filed Aug. 2, 1930  4 Sheets-Sheet 4

Inventor
George R. Bryant
By Mason Fenwick Lawrence
Attorneys

Patented Nov. 15, 1932

1,887,798

UNITED STATES PATENT OFFICE

GEORGE ROCK BRYANT, OF LAWRENCEVILLE, ILLINOIS, ASSIGNOR TO HENRY VOGT MACHINE COMPANY, OF LOUISVILLE, KENTUCKY, A CORPORATION OF KENTUCKY

ROTARY FILTER PRESS

Application filed August 2, 1930. Serial No. 472,671.

This invention relates to filter presses of the rotary type, for separating liquid-solid mixtures, and more especially to the construction of filter plates, central shaft, and scraper means.

An object of the invention is to so construct the filter plate that no ledges, screws, bolt heads, etc. shall interfere with the free fall of the solid collected, when loosened from the filter fabrics.

Another object is to provide traps in the central hollow shaft, which will allow compartments of the filter plates in the upper half of their revolution to drain out through the shaft, while preventing them from draining into compartments in the lower half of their revolution.

Another object is to provide scraper bars for preventing accumulation of solid on the interior surfaces of the press casing, mounted in a manner to be easily removed when necessary.

Another object is to reduce the internal volume of the casing by employing a double conical screw conveyor of small diameter at its ends, as will be described below.

In the accompanying drawings which show a form of the invention:

Figure 1 is a side view of the complete press, partly in section showing the filter plates 2 and other internal parts.

Figure 2 is a partial side view of the bottom portion of the press casing 1, showing inlets 10.

Figure 3 is a partial side view, with the top of the press casing 1 in section, showing a modification in which nozzles are employed for spraying the filter plates.

Figure 4 is an end view of the complete press, partly in section.

Figure 8:
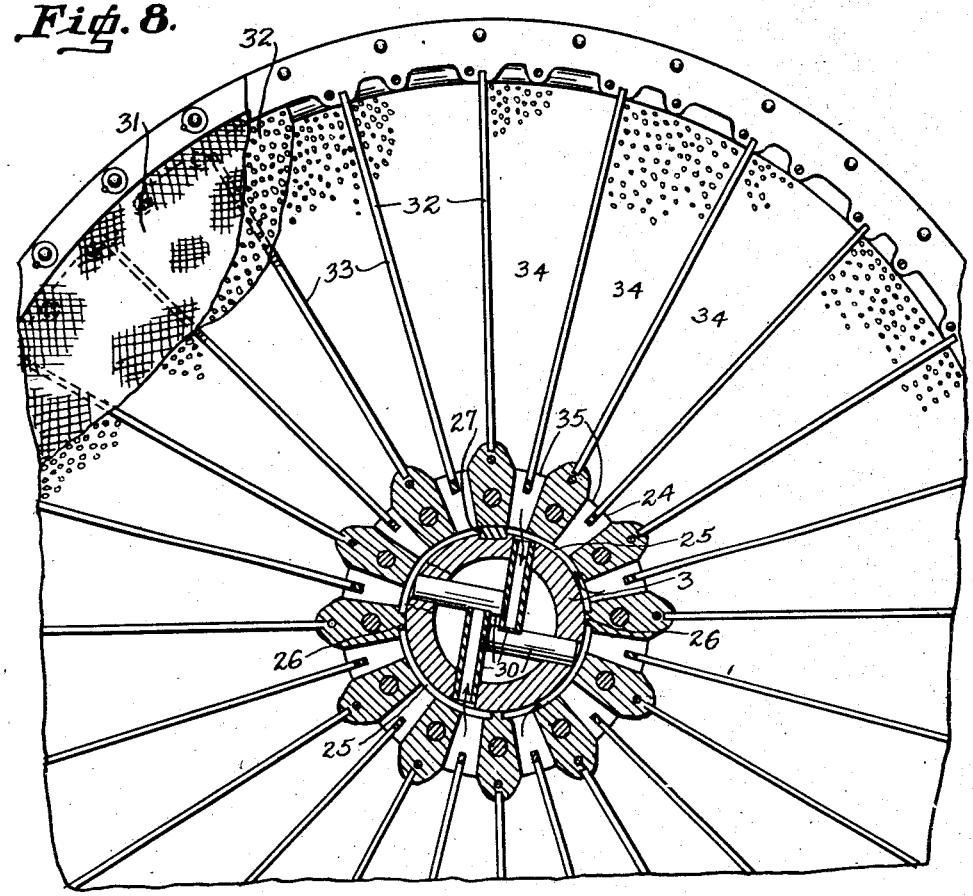

Figure 5 is a section of the filter plates 2 and their hubs 24 mounted on the central hollow shaft 3, taken parallel with the shaft.

Figure 6 is an enlarged section of the outer rim 43 and rings 42 of a filter plate, seen in Figure 5.

Figure 7 is a detailed view of the scraper 47 and end of supporting bracket 46.

Figure 8 is a side view, partly in section, of a filter plate and its hub; and

Figure 9:
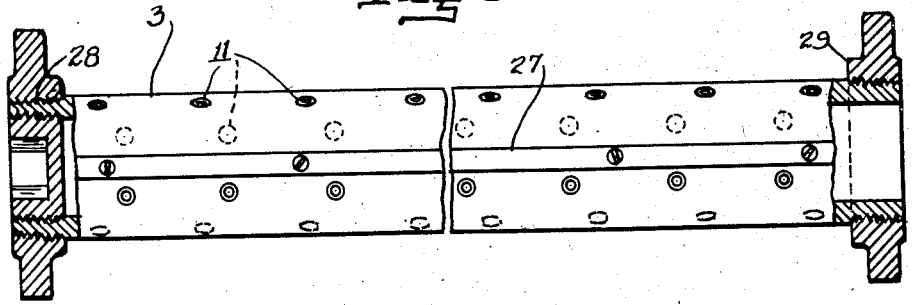

Figure 9 is a view of that part of the center shaft which is inside the press casing, with its ends and end nuts 28 and 29 in section.

The same numerals refer to corresponding parts in the different figures of the drawings.

In Figure 1, the casing 1 houses the filter plates 2, which are mounted on the hollow shaft 3, rotated by worm gear 4, driven by worm 5. In Figure 4 is seen one of the circular filter plates 2 in casing 1, which is cylindrical except for the trough shaped formation at its bottom, indicated by dotted lines in Figure 4, for housing the double conical screw conveyor 6 seen in Figure 1. A universal joint 7 connects the two parts of the double conveyor.

Casing 1 parts on a horizontal plane and is provided with closely spaced bolts 8, as seen on Figure 4, completely around the parting, to provide for internal working pressures up to 150 pounds per square inch, or more. Rings 9 provide for lifting the upper half of the casing.

Figure 2 shows four inlets 10 near the bottom of casing 1, for admitting the liquid-solid mixture. Filter plates 2 are hollow cells covered with a fine mesh filter fabric, which may be cotton ducking, woven wire, or other material, as well known in the art, which will be referred to as the fabric. Hollow shaft 3 has openings 11 through its wall, Figure 9, matching the hollow filter plates 2 mounted on it. The shaft is journaled in suitable bearings 12 and 13, provided with packing glands 14 and 15, as shown. At the end opposite the drive gear 4 is an outlet 16, with packing glands 17, connected with discharge pipe 18, all of which construction is well understood by one versed in the art.

While the machine is adapted to various filter press uses, the operation will be described with reference to the separation of wax from oil. The liquid-solid mixture of oil and wax is forced in under pressure at inlets 10 and completely fills casing 1. The liquid oil passes through the fabrics to the interior of filter plates 2, leaving the solid wax caught on the fabrics as known in the art. The oil passes from the hollow filter plates into the hollow shaft, then through the outlet 16 and away through pipe 18 and valve 19.

The wax so caught builds up a cake on the fabrics. As it becomes thicker, it resists the flow of oil through it. Inspection doors 20, Figures 1 and 4, may be removed, opening hand holes 21, to make direct observation of the cake thickness.

When sufficient thickness of wax cake is built up, the supply of oil-wax mixture is stopped by valves, not shown, leading to inlets 10, while drain 22 is opened. Pressure is still maintained in the casing by admitting air under pressure at air inlets 23 on top of the casing, Figure 4. The oil-wax mixture from drain 22 is returned to the supply tank from which it came. The air pressure is maintained for a time after the casing is empty, allowing the air to blow through the wax cake into the hollow filter plates and out through the hollow shaft. This blowing frees the pores of the wax cake of oil mixtures. The shaft and filter plates are still rotating during the blowing which empties the hollow filter plates of oil, as follows:

Each filter plate has a hub 24, fitting closely on shaft 3, with four internal recesses 25 adjacent to and surrounding the shaft. Three of the four divisions between the four recesses are cast in the hub, one of these being shown at 26, Figure 5. The key 27, Figures 5 and 8, serves as the fourth division. Key 27 extends the full length of the shaft inside the casing. In this manner the hubs are all keyed to the shaft to turn with it. And the hubs are held laterally by being strung on the shaft, with gaskets between them, and compressed together by end nuts 28 and 29, Figure 9. Anchored in position in this manner on the shaft, each hub is designed to be placed with its four internal recesses covering four openings in the shaft wall. The openings are seen in Figure 9, which shows the length of shaft which is inside the casing.

Into each of said openings in the side wall of the shaft a short conduit, or nipple, 30, is inserted with a driving fit so as to reach beyond the center axis of the shaft, as seen in Figures 8, 5, and 4, serving as traps.

The filter fabrics 31 are supported against the working pressure by the perforated metal discs 32, Figures 5 and 8, which in turn are supported against collapsing under the pressure by spokes 33. The spokes then divide the hollow filter plate into a number of compartments 34, Figure 8, which communicate through ports 35 with internal recesses 25. As the shaft and filter plates rotate, oil in a compartment which is up drains through port, recess and nipple into the hollow shaft. The shaft is of such internal diameter that the stream of oil only partly fills it, running out through outlet 16 and pipe 18, and so is not deep enough in the shaft to overflow a nipple connected with a compartment that is down. Nipples 30 act as traps, providing for completely emptying the compartments of the filter plates as they rotate. During this operation the air is blowing the free oil out of the wax cake into the hollow filter plates, from which it runs out through the shaft.

The admission of air at 23 is stopped now and outlet valve 19 is closed. Valve 36 is opened, admitting air under pressure to the interior of the filter plates, bulging the fabrics outward, breaking the wax cake loose and letting it drop to the bottom of the casing, where it is gathered by the double screw conveyor 6 to the wax discharge at the center, normally closed by cover 37. The conveyor 6 is operated, when required, by clutch 38, Figure 1, tripped by lever 39, Figure 4.

Drain 22, Figure 4, enters the bottom of casing 1 at the center and turns down, to prevent wax from dropping into it and to reach nearly to cover 37, so as to drain the casing as completely as possible and leave little oil to run out with the wax cake when cover plate 37 is removed. In order to reduce the amount of contents that must be drained out of the casing and returned to the supply tank, the volume of casing 1 is reduced by making conveyor 6 of conical shape, with small diameter at its two ends.

At its extreme ends, only the cake from the end plates must be moved, while toward the center of the machine the cake from all the plates must be moved. The increasing diameter of the conveyor provides for the increasing amount of cake toward the center. And the diminishing diameter of the conveyor toward its ends permits a diminishing of the trough of the casing which houses the conveyor, reducing the internal volume of the casing. It also gives a slope to the trough from both ends toward the center discharge.

To prevent any interference with the pieces of loosened cake falling down through the narrow spaces between filter plates 2, a special construction of plates is provided in which no ledges or screw heads project out beyond the plane of the filter fabric.

As seen in Figures 5 and 8, the filter fabrics are supported on perforated discs 32, one on each face of the filter plate. The fabrics are bound in place at the hub by rings 40 and bolts 41, as easily understood from Figure 5. At the periphery the fabrics are bound in place by rings 42. In Figure 6 is an enlarged section of the rim 43, rings 42 and bolts 44, binding fabrics 31 in place. As here seen, rim 43 is formed with a recession on each side toward its outer edge, of such depth that rings 42 are flush with the face of the filter plate and so a little below the face of the fabric. The flat head bolts 44 have special sleeve nuts 45, internally threaded and provided with a head like the bolt head, both bolt head and nut being countersunk flush with rings 42, as seen in Figure 6.

With rings and bolt heads and nuts flush with the filter plate, pieces of wax cake loosened from the fabric by its bulging have nothing to catch on. No poking to free jammed cake will be necessary, with danger of tearing the fabric. The narrow spaces between the filter plates will always clear themselves when the cake is loosened by bulging the fabric, as above described.

To prevent accumulation of wax on the inner surfaces of casing 1 to a thickness sufficient to interfere with the rotation of the filter plates, scraper bars are provided, carried by brackets mounted on shaft 3 and sweeping a little closer to the casing walls than the filter plates do, so as to leave a clearance always for the plates.

At suitable distance apart, brackets 46 are mounted on shaft 3, as seen in Figure 1, clamped between hubs of filter plates by the end nuts 28 and 29, Figure 9, on the shaft. Bracket 46 is of skeleton design, to avoid broad surfaces on which wax would build up and bridge across to adjacent filter plate surfaces. A bracket 46 is seen in place on the shaft, inside the casing, in Figure 4. The center hole of the bracket, fitting the shaft, has a key way slot to engage the key, above described as extending the length of the shaft, to insure its turning with the shaft.

At the two ends of bracket 46 angle irons 47 are attached, serving as scraper bars for the purpose above described. A suitable form of attachment of scraper to bracket is shown in Figure 7, where also one of the notches 48 is shown, cut out where the bars must pass over the outer edges of the filter plates. This is shown also in Figure 5, where it is seen that the scraper bars reach only slightly beyond the periphery of the filter plates. The clearance between filter plates and casing is small then, reducing the internal volume of the casing. When necessary to remove the plates for repair or renewal of the fabrics, this construction of scraper bars and supporting brackets facilitates their removal.

In case of failure of the filter fabric or leak from other cause, the oil-wax mixture would pour through to outlet pipe 18, where only clear filtered oil should flow. In pipe 18 is inserted indicator 49, having glass windows 50, permitting the operator to look through the stream by holding a light on the other side. A leak in the filter system is indicated by turbidity of the outflowing stream, due to flakes of wax carried in the oil, which have gotten through at the leak.

In filtering operations where clay, or other agent, is mixed with the liquid for gathering the solid phase by contact, to aid in the filtering, the cake formed on the fabric may not be firm enough to be loosened effectively by the bulging alone. In this case, the removal of the cake may be assisted by washing. In Figure 3 is shown a header pipe 51, with nozzles 52 threaded into a row of suitable openings in the top of casing 1, for spraying a wash liquid on the filter fabrics as plates 2 rotate, to wash down the solid cake to the trough and conveyor 6 at the bottom of the casing.

The invention is not intended to be limited to the form of any of the details shown or described, but is intended to embrace the scope of the following claims.

What is claimed is:

1. In a filter press, the combination of a casing; a rotatable shaft extending through the casing; filter plates on the shaft; and scraper means mounted on the rotatable shaft, comprising a bar adapted to sweep close to the inner wall of the casing and supporting arms between the filter plates.

2. In a filter press, the combination of a casing; a rotatable shaft extending through the casing; filter plates having hubs mounted on the shaft; arms mounted on the shaft between the hubs; and scraper bars mounted on the arms adapted to sweep close to the inner wall of the casing.

3. In a filter press, the combination of a casing; a rotatable shaft extending through the casing, having a key; filter plates borne by hubs having key ways, mounted on the shaft; rings having key ways, mounted on the shaft between hubs and carrying arms; and scraper bars mounted on the arms adapted to sweep close to the inner wall of the casing.

4. In a filter press, the combination of a casing; a rotatable shaft extending through the casing; filter plates having hubs mounted on the shaft; rings mounted on the shaft between hubs, having radial arms; end nuts on the shaft for clamping all the hubs and rings together; and scraper bars mounted at the end of the radial arms, for preventing accumulation of solid matter on the inner wall of the casing.

5. In a filter press, the combination of a casing having a horizontal cylindrical portion and a longitudinal trough at its bottom sloping from its ends toward its center, with a discharge opening for solid matter near the center; a drain pipe entering the trough and extending downward into the solid matter discharge, for draining the casing completely of liquid; filter plates of equal diameter in the casing above the trough; and a double screw conveyor in the trough for gathering to the discharge opening solid matter falling from the filter plates.

6. In a filter press, the combination of a rotatable hollow shaft having pairs of oppositely disposed openings through its walls at intervals along its length, a plurality of hubs arranged along said shaft, each hub having a pair of oppositely disposed recesses in its inner periphery, the walls of each recess completely surrounding one of said openings and the recess communicating with such opening, a peripheral flange extending from the middle of each hub, diametrically opposite ports extending through the flange, one or more of said ports communicating with each of said recesses, spokes extending from said flange, a porous covering over each side of said spokes and flange, and clamping rings holding the covering to the flange.

7. In a filter press, the combination of a rotatable hollow shaft having openings along its length arranged in groups of two or more, the openings of each group being spaced substantially equidistantly circumferentially of the shaft, hubs on said shaft, each hub having a plurality of shallow recesses in its inner surface spaced at intervals around the shaft, the walls of each recess completely surrounding and communicating with one of said openings, a peripheral flange around the middle of each hub, the recesses being at least as wide as the flange, ports extending through the flange and hub to the recesses, and a filter element on each flange communicating with its ports.

In testimony whereof I affix my signature.

GEORGE ROCK BRYANT.